United States Patent
Bouzonnet et al.

(10) Patent No.: US 11,172,168 B2
(45) Date of Patent: Nov. 9, 2021

(54) MOVEMENT OR TOPOLOGY PREDICTION FOR A CAMERA NETWORK

(71) Applicant: BULL SAS, Les Clayes-sous-Bois (FR)

(72) Inventors: Loris Bouzonnet, Chatte (FR); Cécile Boukamel-Donnou, Echirolles (FR); Benoît Pelletier, Saint Etienne de Crossey (FR)

(73) Assignee: BULL SAS, Les Clayes-sous-Bois (FR)

( * ) Notice: Subject to any disclaimer, the term of this patent is extended or adjusted under 35 U.S.C. 154(b) by 0 days.

(21) Appl. No.: 16/235,531

(22) Filed: Dec. 28, 2018

(65) Prior Publication Data

US 2019/0215491 A1 Jul. 11, 2019

(30) Foreign Application Priority Data

Dec. 29, 2017 (FR) ...................................... 1763374

(51) Int. Cl.
*H04N 7/18* (2006.01)
*G06K 9/00* (2006.01)
(Continued)

(52) U.S. Cl.
CPC ......... *H04N 7/185* (2013.01); *G06K 9/00523* (2013.01); *G06K 9/00536* (2013.01);
(Continued)

(58) Field of Classification Search
CPC .................................................... H04N 7/185
(Continued)

(56) References Cited

U.S. PATENT DOCUMENTS

| 9,398,231 | B2 * | 7/2016 | Yuasa | ...................... G06T 7/292 |
| 2004/0252194 | A1 * | 12/2004 | Lin | ........................ H04N 7/181 |
| | | | | 348/169 |

(Continued)

FOREIGN PATENT DOCUMENTS

| EP | 2911388 A1 | 8/2015 |
| WO | 2008100359 A1 | 8/2008 |

OTHER PUBLICATIONS

Preliminary Search Report dated Oct. 17, 2018 in French Application 1763374.
(Continued)

*Primary Examiner* — Daniel T Tekle
(74) *Attorney, Agent, or Firm* — ARC IP Law, PC; Joseph J. Mayo

(57) ABSTRACT

A surveillance system of at least one site including video-surveillance cameras, the surveillance system including at least one surveillance camera management module and an artificial neural network for predicting the location of a target in a zone supervised by a camera, connected to the surveillance camera management module, the predicting artificial neural network including a target information acquisition input including data for prediction including data for identifying the camera in which a target has been detected, for positioning the target in the output state. The predicting artificial neural network includes an output of at least one identification of a probable camera the target of which will be probably identified and the camera management module includes an output for transmitting the at least one identification of probable camera to a member including a screen.

11 Claims, 2 Drawing Sheets

(51) Int. Cl.
*G06T 7/70* (2017.01)
*G06N 20/00* (2019.01)
*G06N 3/08* (2006.01)
*G06T 7/20* (2017.01)

(52) U.S. Cl.
CPC ............ *G06K 9/00771* (2013.01); *G06N 3/08* (2013.01); *G06N 20/00* (2019.01); *G06T 7/20* (2013.01); *G06T 7/70* (2017.01)

(58) Field of Classification Search
USPC ........................................................ 348/143
See application file for complete search history.

(56) References Cited

U.S. PATENT DOCUMENTS

| 2007/0182818 | A1* | 8/2007 | Buehler | G08B 13/19641 |
| | | | | 348/143 |
| 2009/0324010 | A1* | 12/2009 | Hou | G06K 9/00771 |
| | | | | 382/103 |
| 2011/0222724 | A1* | 9/2011 | Yang | G06K 9/4628 |
| | | | | 382/103 |

OTHER PUBLICATIONS

Martinel Niki et al., "Camera Selection for Adaptive Human-Computer Interface," IEEE Transactions on Systems, Man, and Cybernetics: Systems, IEEE, vol. 44, No. 5, May 1, 2014, pp. 653-664.

Martinel Niki et al., "Person Reidentification in a Distributed Camera Network Framework," IEEE Transactions on Cybernetics, vol. 47, No. 11, Nov. 1, 2017, pp. 3530-3541.

Wang Lituan et al., "Trajectory Predictor by Using Recurrent Neural Networks in Visual Tracking," IEEE Transactions on Cybernetics, IEEE, vol. 47, No. 10, Oct. 1, 2017, pp. 3172-3183.

Julian Bock et al., "Self-learning Trajectory Prediction with Recurrent Neural Networks at Intelligent Intersections," Proceedings of the 3$^{rd}$ International Conference on Vehicle Technology and Intelligent Transport Systems, Jan. 1, 2017, pp. 346-351.

Shen Yantao et al., "Learning Deep Neural Networks for Vehicle Re-ID with Visual-spatio-Temporal Path Proposals," 2017 IEEE International Conference on Computer Vision (ICCV), IEEE, Oct. 22, 2017, pp. 1918-1927.

* cited by examiner

MOVEMENT OR TOPOLOGY PREDICTION FOR A CAMERA NETWORK

CROSS-REFERENCE TO RELATED APPLICATIONS

This application claims priority to French Patent Application No. 1763374, filed Dec. 29, 2017, the entire contents of which is incorporated herein by reference in its entirety.

FIELD

The present invention relates to the field of real time surveillance of a site by a videosurveillance camera. By site supervised by a videosurveillance camera, it is meant a site such as a town or a district or even a museum, a stadium, a building of which a set of videosurveillance cameras records zones of the site. This technology can be adapted to a surveillance system using several cameras with intersected or not intersected fields of view, that is comprising zones in the site that are out of the field of view of the videosurveillance cameras.

The invention more particularly relates to a real time surveillance system of a site, in particular towns or districts, remotely accessible through a communication network. It will be noted that such a communication network refers preferentially but not limitatively to an Intra- or Internet computer network.

BACKGROUND

The state of the art already knows remote real time surveillance system.

Boards of videosurveillance cameras for the site and detectors that are able to detect moving targets as well as appearance model providers that can give a signature to a target per camera and record a list of characteristics of the target are also particularly known.

In particular, it is known from the appearance model provider to perform target recognition through an artificial neural network which has learnt to recognise a target and assign it a signature per camera as well as parameters also called attributes. This target recognition can enable the operator to launch a search, on all the videosurveillance cameras, for a target recognition when the target has left the surveillance zone.

The drawback is that this search can be long in the case of a great number of cameras but also because of the necessity that the target has already appeared on one of the videosurveillance cameras.

The drawback of the camera board further resides also in the camera topology. Indeed, a camera can be failing or even if a zone of the site is not covered by the surveillance cameras, it can be difficult to know in the case where the target goes into this zone not covered, on which camera the target can reappear.

There is a need for operators to have a more efficient system to be able to follow a target in order to be capable, for example, of intercepting the target.

SUMMARY

An aspect of the present invention is to overcome the drawbacks of the state of the art by providing a real time surveillance of at least one target through a predicting artificial neural network learning the camera topology as well as statistically, the cameras that can probably enable the target to be identified when leaving a zone recorded by a surveillance camera.

To that end, an aspect of the invention is a real time surveillance system comprising videosurveillance cameras, the surveillance system comprising:

at least one surveillance camera management module having at least one input for receiving and one output for sending data:
  of at least one identification of one of the cameras performing a video on a supervised zone of the site,
  of at least one signature corresponding to a mobile target detected on the video,
  of a state of the target in the zone supervised by the camera that can be:
    i an input state in which the target has entered the field of view of the camera,
    ii an output state in which the target is in an end of the field of view,
    iii a disappearance state in which the target has left the field of view,
  of positioning the target in the supervised zone,
an artificial neural network for predicting the location of a target in a zone supervised by a camera, connected to the surveillance camera management module, the predicting artificial neural network comprising a target information acquisition input comprising data for prediction comprising data:
  for identifying the camera in which a target has been detected,
  for positioning the target in the output state before passing to the disappearance state,
the predicting artificial neural network comprising an output of at least one identification of a probable camera the target of which will be probably identified and the camera management module comprising an output for transmitting the at least one identification of probable camera to a man-machine interface member comprising a screen.

Thus, the operator can know the probable next camera to be displayed. The predicting artificial neural network can learn the camera topology and suggest a camera or a list of cameras the target of which will probably appear.

Unlike a Support Vector Machine, SVM, the predicting artificial neural network allows to be simpler, and real time learning to be more precise and faster and especially if there are many classes.

For example, the predicting artificial neural network can learn continuously or from time to time by receiving targets, their positions and identifications of videosurveillance camera recording these targets and then receive the identification of the camera on which the target has been detected thus enabling the predicting artificial neural network to learn incrementally the camera network topology.

According to an embodiment, the camera management module transmits, to the predicting artificial neural network in automatic learning mode the data for predictions as well as the identification of a camera in which the target has reappeared in a zone supervised by the camera after the target has disappeared.

That also enables the predicting artificial neural network to learn and thus to be able to determine as a function of a position of a target, the next probable camera in which the target will be detected.

According to an example, the camera management module receives a set of target data from several tracking pieces of software and the module is able to correlate, through the signatures, the movement of a target from one field of view of a camera to a field of view of another camera to be able to transmit to the predicting artificial neural network for its incremental learning.

The target can have one signature per camera. The signature of a camera and the signature of another camera of the same individual will be close enough to each other for the camera management module to be able to correlate both cameras and thus recognise the target.

In other words, because of the signatures for each target on one image of a first camera and then of other signatures on another image of a second camera etc., the camera management module can correlate between two close signatures to identify a same target and thus the path traveled by the target between this first camera and this second camera. Thus, the module can use this data to perform an incremental learning to the artificial neural network by sending it at least:

the identification of the first camera,
the position in the output state or the last position of the target in the first camera,
the identification of the second camera.

In order to improve the probability, the module can further send:

the class of the target or/and, the direction of the target or/and the speed of the target.

According to an embodiment, the surveillance camera management module further receives target direction and sense data and the target data for prediction sent to the predicting artificial neural network further comprises this direction data in the output state.

That enables the probabilities that the most probable camera identified by the predicting artificial neural network identifies the target in its field of view to be improved.

According to an embodiment, the surveillance camera management module further receives target speed data and the target data for prediction sent to the predicting artificial neural network further comprises this direction data in the output state.

That enables the probabilities that the most probable camera identified by the predicting artificial neural network identifies the target in its field of view to be improved.

According to an embodiment, the surveillance camera management module further receives target class data and the target data for prediction sent to the predicting artificial neural network further comprises this class data in the output state, wherein the class of the target can be a pedestrian, a two-wheel vehicle, a four-wheel vehicle or else.

According to an example of this embodiment, the class of the four-wheel vehicle is under classified as a car or a truck.

Thus, for a site such as a district or a route, learning to the predicting artificial neural network the probable paths per target enables the probabilities that the most probable camera identified by the predicting artificial neural network identifies the target in its field of view to be efficiently improved.

According to an embodiment, the state of the target in the zone supervised by the camera that can be further in an active state in which the target is in a zone of the field of view surrounded by the output zone.

In other words, the target after it has been in the new state switches to the active state as soon as the tracking software has received the signature of the target by the appearance model provider and as soon as the target enters a zone of the field of view of the camera which can enable the target to be about to leave the field of view of the camera, the target switches to the output state.

It will be appreciated that the tracking software can add output zones in the middle of the field of view of the camera when it detects a target disappearance zone. This is in particular the case for example when there is a tunnel entrance in the middle of a road.

That enables the operator to have statistics of the path on which the target can travel. Thus, it is probable to send people, for example police, to intercept the target more quickly and thus to avoid a high-speed pursuit.

According to an embodiment, the surveillance camera management module is able to receive a target prediction demand request comprising a signature, and the predicting artificial neural network can send at its output a list of camera identifications by probability and the surveillance camera management module is further able to send to the interface machine the identification of the camera the target of which is in the active state and a possible probable ordered list by probability of the camera identifications.

The prediction demand request can be made by selecting by an operator on a video a camera displayed on a screen.

The request can also be made by an image of the target sent to the camera management module which can ask directly the appearance model provider to receive one or more probable signatures of target recorded by one or more cameras.

Further the request can be a request of attributes, for example class=pedestrian, top clothing colour=red, hair colour etc. and thus select a number of probable targets recorded by the cameras.

According to an embodiment, the surveillance camera management module is able to add on a zone of the video the target of which is identified in the active state or in the output state, a video recorded by a probable camera identified by the predicting artificial neural network.

According to an embodiment, the surveillance camera management module is able to send a surveillance camera node list as well as the path of the target of the first camera that has identified the target to the most probable camera of the target and for example another characteristic such as the class, the weights of the paths between the cameras.

For example, the weights can be calculated per class per camera.

That enables the most frequently used paths to be known for a given class. That can enable to the urban conglomeration service of a town to know for example the most frequently used roads and thus those who have potentially the highest maintenance need. Further, it can also enable the real time traffic to be known.

According to an embodiment, the management module and the predicting neural network are in the same computer or separately connected by a public or private network or in a same server or in separate servers. The artificial neural network used is for example of a multilayer perceptron type for the sake of classification for example MLPCclassifier® from the Scikit Learn® Library. The predicting neural network can be of the deep learning type.

For example, the predicting neural network comprises an input layer comprising neurons having an activation function, for example Rectified Linear Unit "ReLU", including at least one positional neural and a camera identification neuron, a hidden layer comprising neurons having activation function for example of rectified linear unit and an output layer comprising at least one neuron having activation function for example Softmax, for predicting the surveillance camera.

The input layer comprises for example nine neurons. For example, the input layer can comprises one neuron for the class of the target (pedestrian, car, truck, bus, animal, bike et cetera), four neurons for the position of the target (for example two positions of the target in the image according two axes and two positions for the surveillance camera if it mobiles), two neurons for the target direction in the image according the two axes, one neuron for the target speed in the image and one neuron for the camera identification, so nine variables.

The hidden layer can comprise for example one hundred neurons having activation function like Rectified Linear Unit "ReLU".

The output layer can comprise one neuron by probability of surveillance cameras identify with the greatest probability appearance target. For example, the output layer comprises five neurons for five probability of the five surveillance cameras identify with the greatest probability appearance target.

According to an embodiment, the system further comprises one target tracking software assembly per surveillance camera. The target tracking pieces of software can be on one or more computer members such as a computer.

The target tracking software is able to follow the target and deduce the target direction and speed therefrom, identify the target state and send to the surveillance camera management module the target data comprising the target direction, speed, position, state and the target signature.

According to an example of this embodiment, the system further comprises a detector enabling a target image to be extracted from the video, an image recognition to be performed to assign the target class, and the extracted image as well as its class to be sent to the tracking software assembly. The tracking software thus sends the video stream to the detector.

According to an example, the detector identifies in the image the position of the target in the field of view.

According to another example, it is the target tracking software that enables the target position to be identified in the field of view.

According to one example of this embodiment, the system comprises an appearance model provider for:
  receiving the image extracted by the detector as well as its class,
  giving a signature to the target,
  identifying a number of target characteristics such as colour etc.
  storing in a memory the characteristics and signature of the target, and finally sending to the tracking software assembly the signature corresponding to the image received.

According to an example of this embodiment, the tracking software assembly transmits to the surveillance camera management module the target signature, speed, direction, class and state.

According to an example of this embodiment, the appearance model provider uses a reidentification component using a RESNET 50 type neural network to perform signature extraction of the targets detected and thus recognise from the characteristics of the target on an image, a signature and further identify and extract characteristics of the target also called attributes.

The signature can be represented as a floating point vector. The appearance model provider can then, for an image of the target from a camera, search in a database a similarity with a signature of a previous image from another camera. The similarity search for two signatures can be calculated by the minimum cosine distance between two signatures of two images from two different cameras.

The model provider can for example send the last signature calculated for example with a link with the first similar signature identified with a tracing software to inform it that these two signatures are the same target.

Thus, it enables the target to be reidentified when the same is in the new state in a field of view of a camera.

Thus, the appearance model provider can record and recognise the target in a same camera but it can also make it from one camera to another.

According to an embodiment, the system further comprises a detector software enabling targets moving on a video of a camera to be identified and the detector isolates the target for example by cutting off a rectangle in the video.

According to an example of this embodiment and of the previous embodiment, the detector comprises a target recognition artificial neural network able to perform an image recognition to identify the target class, wherein the target can be a pedestrian, a two-wheel vehicle, a four-wheel vehicle such as a truck or a car or else.

The two-wheel target can comprise two sub-targets comprising a sub-target bicycle and a sub-target motorcycle.

In "else", the target can be for example, a pedestrian using a means of transport such as rollers, a scooter etc.

According to an example, the detector can comprise a characteristic extraction algorithm to make an abstraction of the image to send as an input to the target recognition artificial neural network.

According to another example, the detector comprises a SSD ("Single Shot multiBox Detector") type convolutional neural network.

An aspect of the invention also relates to a method for following a target using a surveillance system, wherein the following method comprises:
  a step of requesting the following of a target on an image,
  a step of recognition of a signature of the target in a signature data base,
  a step of following the target on a video performed by a surveillance camera recording a zone of the site,
  a sending step in which the management module sends to the predicting artificial neural network target data including at least the position of the target when the same is located in a zone of the zone recorded by the surveillance camera corresponding to an output state,
  a step of receiving from the predicting artificial neural network an identification of a probable camera in which the target can appear if it disappears from the field of view of the camera identified,
  a step of adding on the video of the camera identified the identification of the probable camera,
  a step of sending the viewing, to the member comprising a screen, of the video as well as the identification of the probable camera.

According to an embodiment, the method can further comprise:
  a step of creating a list of identifications of probable camera with their success probability and adding on the camera an identification number of probable camera with their probability.

According to an embodiment, the method comprises:
  a step of receiving a set of data from all the target tracking pieces of software,
  a step of identifying a passage of the target from one field of view of a camera to another field of view of another camera by comparing the signatures,
  a step of incrementally learning the predicting artificial neural network from the last position of the field of view of the previous camera as well as identifying the previous camera and identifying the camera having an image representing the same target for example by receiving a piece of information that the signature on the target in the new state is close to a target signature in the output state of the previous camera.

By close, the system can have a minimum distance between both signatures to accept both signatures as similar for example for incremental learning. For example, for each class, targets having rare (distinctive) attributes can be used such that both signatures of the same class in two cameras are far from other signatures of other targets. For example, the incremental learning for a pedestrian class can be made with signatures, far from other signatures of other individuals, representative for example of a pedestrian wearing a red top and a red bottom readily recognisable with respect to the other pedestrians.

Therefore, it enables the camera management module to make an incremental learning from a target having a strong probability that this is the same individual that is same car or same truck or same pedestrian etc.

According to an example of this embodiment, the incremental learning step further comprises as an input piece of information, the last direction and the last speed of the target received in the previous camera.

According to an example of this method, the method further comprises:
- a step of detecting a target in the new state by the tracking software (target entering the field of view of the camera),
- a step of sending an image of the video stream comprising the target in the new state to the detector,
- a step of detecting the class and the position of the target in the field of view of the surveillance camera,
- a step of sending the position of the target in the image received as well as the class of the target to the tracking software and an image of the target,
- a step of sending to an appearance model provider an image of the target,
- a step of signing the target, enabling an identification to be given to the target,
- a step of sending to the camera management module the position, the class, the signature and the new state of the target,
- a step of detecting the target in the output state,
- a step of sending the image of the target in the output state to the detector,
- a step of determining the position of the target in the field of view of the surveillance camera,
- a step of sending to the camera management module the position, the class, the signature and the output state of the target.

In an example of the previous embodiment, the method further comprises a step of calculating the direction and speed of the target in the output state as a function of positions and date comprising the time of the target from the new state to the output state.

According to another example, it is the camera management module which calculates the speed and direction and receives the date (comprising the time) for each state of the target and position.

According to an embodiment, the method comprises a succession of image sendings of the tracking software and a succession of receptions of the position of the target from the new state to the output state of the target. (That is also in the new state).

That makes it possible to be more precise about the target speed and direction. Indeed, it enables target direction changes as well as decelerations or even brakes or accelerations of the target moving in the field of view of the camera to be taken into account.

According to an embodiment, the method comprises a step of recording target characteristic determined by the appearance model provider and recording the signature and characteristics of the target to be able to re-identify the target with another image of another profile of the target in particular an image of the target from another camera having another signature but close to the previously recorded signature.

The invention and its different applications will be better understood upon reading the description that follows and upon examining the accompanying figures.

BRIEF DESCRIPTION OF THE FIGURES

These will be shown only by way of indicating and in no way limiting the invention. The figures show.

DETAILED DESCRIPTION

The different elements appearing on several figures keep the same reference, unless otherwise indicated.

Figure 1:
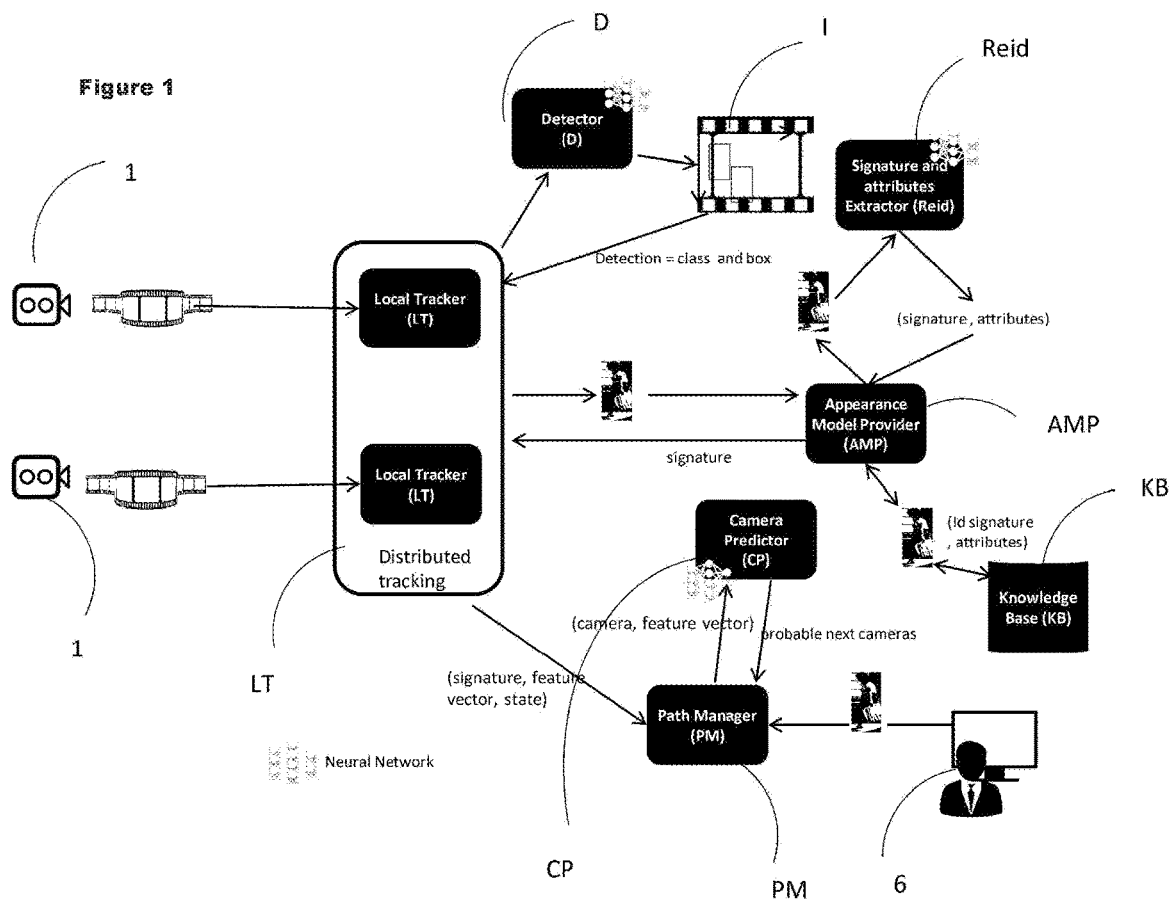
FIG. 1 represents an architecture according to an embodiment of the invention

FIG. 1 represents an architecture of a surveillance system of an embodiment of the invention.

The surveillance system enables a site to be supervised in real time comprising videosurveillance cameras Xn (n being the number of cameras X). Herein, only 2 cameras X1 and X2 are represented for the sake of simplicity but the invention relates to a camera node comprising several tens or even hundreds of videosurveillance cameras X.

The surveillance system further comprises target tracking pieces of software LT, herein a tracking piece of software LT by a videosurveillance camera 1.

These target tracking pieces of software LT can be gathered in a machine such as a computer or be dispatched, for example in each of the cameras.

The surveillance system comprises at least one management module PM for surveillance cameras 1X having at least one input to receive data from the videosurveillance cameras X from all the target tracking pieces of software LT.

The data sent to the management module PM comprises at least one identification of one of the cameras X making a video on a supervised zone of the site, at least one signature corresponding to a mobile target detected on the video as well as the position of the target in the video and at least one state of the target in the zone supervised by the camera.

By signature, it is meant an identification of the target, enabling the target to be retrieved in another camera. The designation of the signature and identification of the same target in another camera are explained in more detail hereinafter.

Figure 3:
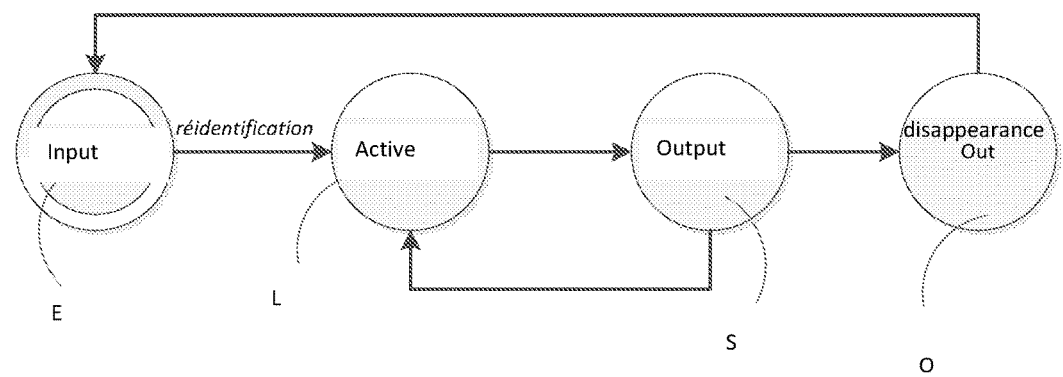
FIG. 3 schematically represents a state cycle of a cycle in a field of view of a camera.

FIG. 3 represents the different states of the target.

The state of the target can be an input state E, this state is put on the target when the target has just entered the field of view of the camera X1.

The state of the target can further be active L, it is the state in which the target is in the field of view of the camera after the target in the input state E is sent to the camera management module.

The state of the target can also be in an output state S, it is the state in which the target is in one end of the field of view. For example, within 10% of the field of view of the camera thus surrounding the 90% of the field of view in the active state A.

Finally, the target can be in a disappearance state O, when the target has left the field of view of the camera (that is it does not appear on the video any longer).

The position of the target can be identified for example by coordinates in a plane of the field of view of the camera (according to an abscissa and an ordinate in the field of view). If the camera is mobile, the angle of the camera can further be added to the coordinates to give a position of the target in the field of view.

It will be appreciated that, in the case where the target is in the disappearance state O, either the tracking software LT does not send a position, or it sends the position recorded in the output state S or in a position close to the same if the target has been moved between its position sent in the output state and its last position identified.

In this example, the position of the target is defined by a detection component, also called detector D in the following.

The surveillance system further comprises a predicting artificial neural network CP for locating a target in a zone supervised by a camera X1. This predicting neural network CP is connected to the management module PM. The predicting neural network CP comprises a target information acquisition input. In particular, the data sent to the predicting neural network CP comprises the identification data of the camera in which a target has been detected as well as the position data in the output state indicating the positioning of the target in the output state before passing to the disappearance state.

The predicting neural network CP is for example a multilayer perceptron type neural network for the sake of classification, herein a MLPC Classifier from the Scikirt Learn library.

The predicting neural network CP comprises an output, at least one identification of a probable camera the target of which will be probably identified, which is connected to the camera management module PM. The camera management module PM comprises an output to transmit the at least one identification of probable camera to a man-machine interface member 6 comprising a screen such as a computer.

Further, the camera management module can transmit the video to the predicting camera.

Herein, in this embodiment, the predicting neural network CP receives other data from the target. Herein, it receives target direction and/or sense data from the camera management module PM as well as speed data.

The target direction and speed data is herein calculated by the camera management module PM.

Further in this example, the predicting neural network receives as an input class data for the target from the camera management module PM.

The class of a target is determined by the detector D which transmits the class of the target class to the tracking software LT.

In other words, the detector D enables the target position and class to be provided in an image. Herein, the detector D is capable of providing the position and class for several targets in an image.

The detector D can be a single software for all the tracking pieces of software LT or can be duplicated to each operate with a predetermined amount of target pieces of software. The software includes machine executable instructions embedded, e.g., in a non-transitory computer readable medium. The machine executable instructions are executable by a processor of a computer.

The detector D comprises a neural network, herein an SSD type convolutional network. This neural network which experienced a learning enables for each target in an image received the class and position to be determined. The class can herein in this example be a pedestrian, a two-wheel vehicle, a car or even a truck. There can be other classes such as a bus, a taxi, or even an autorickshaw. The detector D can further cut off the target in the image, herein, it can cut off several targets in rectangles. That is in particular schematically represented in FIG. 1 as the representation of a film I.

In the following, an example of a target will be described, herein having a so-called "pedestrian" class.

The tracking software LT transfers the cut-off images and thus herein the cut-off image of the "pedestrian" target to an appearance model provider AMP.

It is this appearance model provider AMP, called in the following AMP provider which will transmit, to the tracking software LT, the signature of the target. The AMP provider uses a re-identification component Reid comprising herein a neural network herein of the ResNet 50 type but could also use a data acquisition algorithm. The AMP provider sends the image of the target to the reidentification component Reid which calculates a signature of the target according to measurements on the target image. That will enable in the following the target to be re-identified by correlating two signatures in another image received in another camera.

In this example, the re-identification component Reid provides to the provider AMP further information measured on the target also called "attributes", such as for example for a pedestrian, the colour of a top or bottom of a pedestrian, the hair type (brown or fair or red) and other characteristics . . . . For a car, it can be the car colour, height etc. and if possible, the reading of the car license plate.

Thus, in the example of FIG. 1, from the image of the target, from the camera X1 having a visible pedestrian class, sent to the AMP provider by the tracking software, the reidentification component Reid determines herein that the pedestrian is a tall brown woman with a red dress and wearing a beige handbag with a size between 30*40 cm and 35*45 cm. The component Reid calculates a signature of this target from target measurement and further identifies characteristics (attributes). The AMP provider then records in the database the characteristics (attributes) and signature of the target. The signature can be represented as a floating number vector.

The appearance model provider AMP or the reidentification component can then search in a database for a similarity with a signature of a previous image of another camera. The search for similarity of two signatures can be calculated for example from the minimum cosine distance between two signatures of two images from two different cameras. In this example of the pedestrian image from the camera X1, the provider finds a signature of a target from a similar camera X2 recorded in the database for example 3 minutes before. For example, the signature is different because the identified size is medium. Since the AMP provider knows that a target can switch from a large to medium height and vice versa when it is close to the bound separating both heights because of possible deviations in measurements, it deduces therefrom a similarity of both signatures. In this example, there are three height types: small, medium and large but they could be furthermore.

According to another embodiment, it is the management module which makes this similarity search of the two signatures in the database.

The AMP provider in this example sends the last signature calculated for example with a link of the identified similar signature to the tracking software to inform it that these two signatures are potentially the same individual.

The tracking software LT then transmits to the camera management module PM the signature of the target in the new state, the similar signature.

The camera management module PM can thus search for the similar signature in the output state received from the tracking software of the camera X2 previously, make the possible correlation between these two signatures and send to the probable neural network in incremental learning mode prediction data.

The learning prediction data can be:
the target class, herein pedestrian,
the target position in the output state, herein for example coordinates in the image,
the target speed calculated in the output state, for example 5 km/h
the target direction calculated in the output state, for example a function of a straight line,
the identification of the previous camera (that is that of the target in the output state), herein X2,
the identification of the new camera, herein X2.

Thus, the predicting neural network can learn that it is probable that a pedestrian leaving the field of view of the camera X2 at some position and some speed and direction will be then visible on the camera X1.

Figure 2:
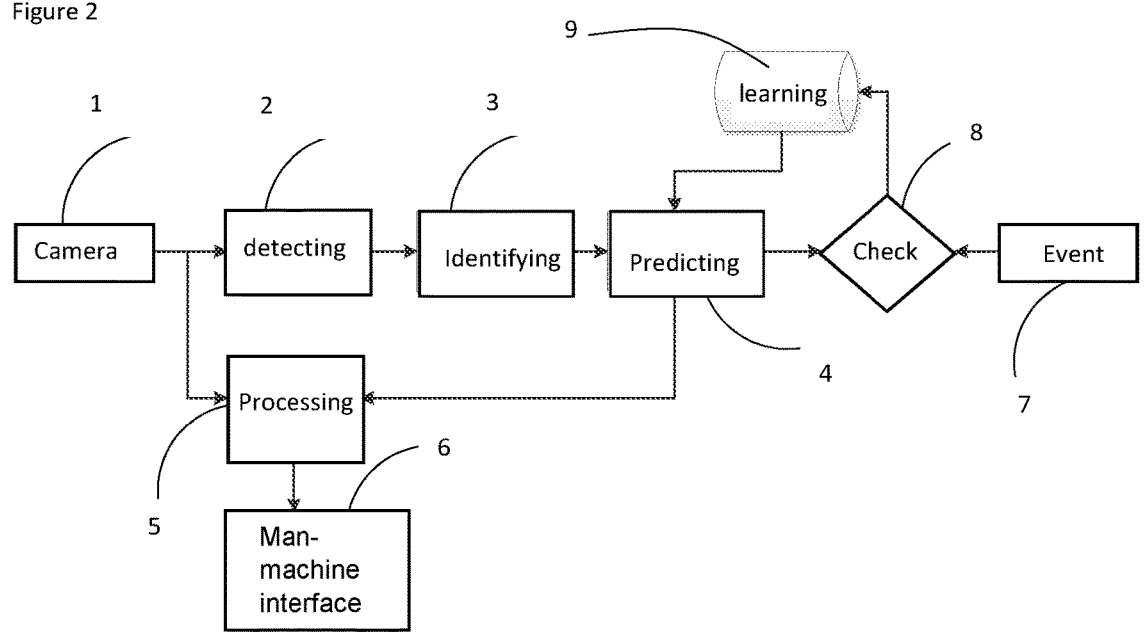
FIG. 2 represents a diagram of an image stream according to an embodiment of the invention.

An image stream of a single camera is represented in FIG. 2, according to an example of a target prediction method.

The process comprises:
a recording step 1 by cameras X,
a step 2 of detecting by the detector D a target and identifying its class and its position,
a step of bringing to the new state N by the tracking software LT (target entering the field of view of the camera),
a step of sending the image of the target to the AMP provider,
a step 3 of identifying by the AMP provider the target by assigning it a signature and recording a list of its attributes (gender, height etc.),
a step of changing state from new N to active A by the tracking software LT after receiving the signature of the AMP provider,
a step of changing from active state A to the output state S when the target position obtained by the detector is in an output zone,
a step of sending to the camera management module PM the state of the target in the output state as well as its class, its signature, its position, its speed, its direction,
a step 4 of predicting by the predicting neural network the probable camera of target output,
a step of receiving by the camera management module PM a data set from all the tracking pieces of software LT and processing 5 the video the tracked target of which is requested by an operator by adding a list of probable cameras by probability order and for example the film of the most probable camera,
a step of live displaying on man-machine interface member 6 the video comprising the identification of the probable camera,
an event step 7 in which the target requested appears in a film of a camera identified in the new state,
a prediction checking step 8 checking that the identification of the camera, in which the target reappears in the new state, is named in the camera prediction list,
if the camera is not in the list, the state change module PM makes a learning step 9 to the neural network by providing it learning prediction data.

The predicting artificial neural network can thus learn the topology of videosurveillance camera X and suggest a camera or a list of cameras the target of which will probably appear when an operator sends a target follow request.

For example, the predicting artificial neural network CP can learn continuously or from time to time. Thus, in case of adding or degrading a camera, the artificial neural network can suggest the probable camera(s) X with for example a percentage of the following cameras on the video viewing the target live in the output state. According to another example, it can add the live videos in a smaller size on the video showing the target in the output state until the same switches to the disappearance state.

FIG. 3 represents a state cycle of a target in a field of view of a videosurveillance camera X.

A target identified by the tracking software LT, herein entering a field of view of the camera X1, switches to the new state and an image of the video is sent to the detector which cuts off an image of the target, identifies a class as well as the position of the target, and then the cut off image is sent to the AMP provider, which sends back to the tracking software LT a calculated signature.

The tracking software LT switches the target to the active state A and sends the video images to the detector which sends it back the target position until the target has a position in an output zone of the field of view of the camera X1 in which the tracking software LT switches the target to the state S. If the target returns in an active field of the field of vision, for example the target does a U-turn and returns to the centre of the field of view of the camera, the tracking software switches back the target to the active state A until the target returns in an output zone of the field of view of the camera X1. Finally, when the target leaves the field of view of the camera X1, it switches the target to the disappearance state D.

Because the tracking software LT knows the different target positions of the field of view of the camera, it can calculate the speed as well as the direction thereof.

According to an embodiment, the tracking software LT sends to the camera management module PM target information data at each state change, that is herein the speed, position, direction, signature, class as well as state.

The camera management module PM thus receives this data from a set of tracking pieces of software LT. That is why the management module can identify switching of a target, through the signatures, from one field of view of a camera to a field of view of another camera to be able to transmit to the predicting artificial neural network for its incremental learning.

The surveillance camera management module PM can thus receive, from a computer 6 used by an operator, a target follow request for example the operator clicks on a target in the video X1.

Since the target is already identified, it is followed by the tracking software LT and when the target switches to the output state, the management module PM sends to the predicting neural network CP, the identification of the camera, the class of the target, the position of the target in the output state, the target speed calculated in the output state, the target direction calculated in the output state. The neural network transmits a list of identifications of probable camera and herein their probability.

The neural network thus displays on the video, the list of cameras that have a great probability, for example the 5 most probable cameras.

The surveillance camera management module PM can thus add on a zone of the video the target of which is identified in the output state, for example on the top left corner, a video recorded by the most probable camera identified by the predicting artificial neural network.

According to an embodiment, the surveillance camera management module PM can send a node list of surveillance camera as well as the weights of the paths between the cameras calculated per class.

Figure 4:
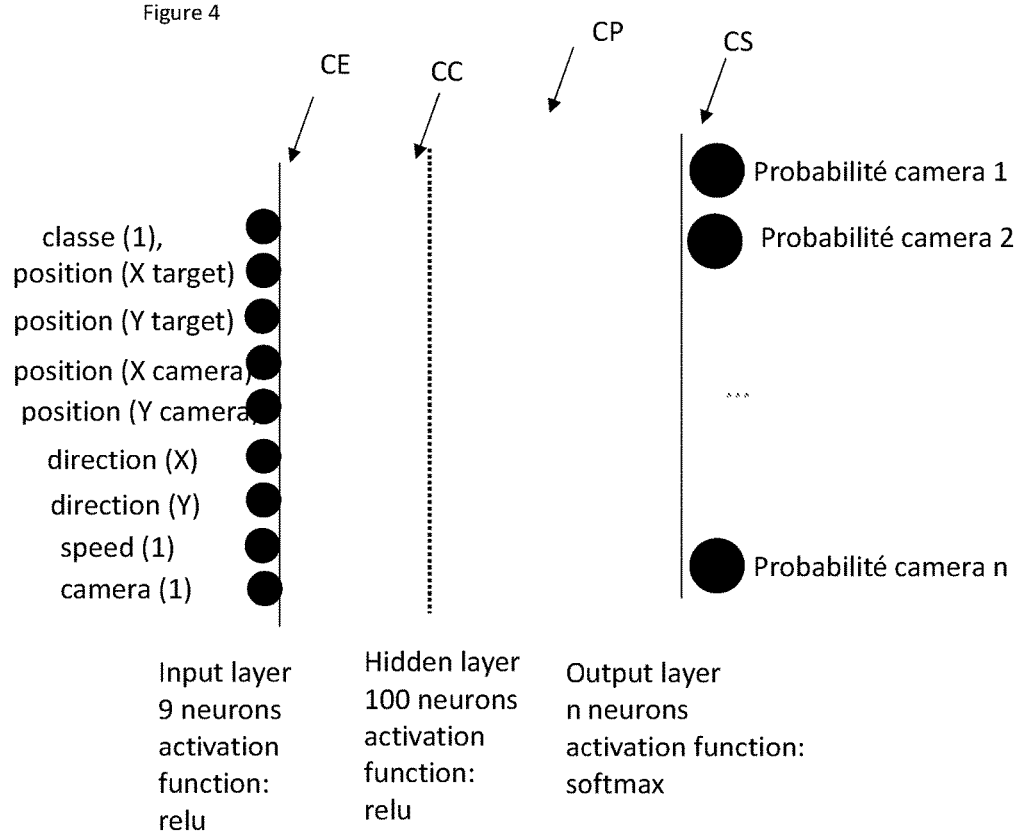
FIG. 4 represents a schematic diagram of an example of a predicting artificial neural network.

The FIG. 4 represents a schematic diagram of an example of a predicting artificial neural network CP. In this example, the predicting artificial neural network CP comprises three layers. For example, the predicting artificial neural network CP comprises an input layer CE comprising neurons having an activation function, for example Rectified Linear Unit "ReLU". In this example, the input layer CE comprises nine neurons: One neuron for the class of the target (pedestrian, car, truck, bus, animal, bike et cetera), four neurons for the position of the target, two neurons for the target direction in the image according the two axes, one neuron for the target speed in the image and one neuron for the camera identification, so nine variables.

The four neurons for the position of the target is this example a position neuron X of the target in the image according an axe X, a position neuron Y of the target in the image according an axe Y, a position neuron X of the surveillance camera according a mobile axe X of the surveillance camera filming the target, so the camera which produces the image wherein the target is detected and position neuron Y of the surveillance camera according a mobile axe Y of the surveillance camera.

It will be appreciated that the input layer can comprise more or less than nine neurons. For example, one more neuron can be a position neuron Z of the surveillance camera according a mobile axe Z of the surveillance camera. Another example, the input layer CE comprises height neurons wherein there is no position neuron of surveillance of camera and there is a neuron position Y of the target in the image. Which can be calculated by the camera.

The predicting artificial neural network CP comprises one hidden layer CC comprising neurones having activation function like Rectified Linear Unit "ReLU". In this example, the hidden layer CC comprises one hundred neurons. The predicting artificial neural network CP can comprise more than one hidden layer CC.

The predicting artificial neural network CP comprises one output layer CS comprising one neuron by probability of surveillance cameras identify with the greatest probability appearance target. In this example, the output layer CS comprises n neurons having activation function of Softmax, for predicting the surveillance camera. For example, the output layer CS comprises five neurons for five probability of the five surveillance cameras identify with the greatest probability appearance target. The neurons by probability of surveillance cameras identify with the greatest probability appearance target create the list of identifications of probable camera with their success probability.

According to an embodiment, the predicting artificial neural network CP can give the identification of a probable camera the target of which will be probably identified in function of a sequence of previously identify camera in the neuron for the camera identification in the input layer.

For example, the list of identifications of probable camera with their success probability is in function of this sequence.

It will be appreciated that the invention is not limited to the embodiments just described.

The present invention has been described and illustrated in the present detailed description and in the figures of the appended figures, in possible embodiments. The present invention is not however limited to the embodiments shown. Further alternatives and embodiments can be deduced and implemented by those skilled in the art upon reading the present description and the appended drawings.

In the claims, the term "comprise" or "include" does not exclude other elements or other steps. The different characteristics shown and/or claimed can be beneficially combined. Their presence in the description or in different dependent claims does not exclude this possibility. The reference signs are not to be understood as restricting the scope of the invention.

Having described and illustrated the principles of the invention with reference to various embodiments, it will be recognized that the various embodiments can be modified in arrangement and detail without departing from such principles. It will be appreciated that the different concepts and aspects of the invention described above can be implemented, for example, using one or more processors, modules, machine executable instructions, computers and/or servers. It should be understood that the concepts and aspects of the invention described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

One or more devices, processors or processing devices may be configured to carry out the function(s) of each of the elements and modules of the structural arrangement described herein. For example, the one or more devices, processors or processing devices may be configured to execute one or more sequences of one or more machine executable instructions contained in a main memory to implement the method(s) or function(s) described herein. Execution of the sequences of instructions contained in a main memory causes the processors to perform at least some of the process steps or function(s) of the elements described herein. One or more processors in a multi-processing arrangement may also be employed to execute the sequences of instructions contained in a main memory or computer-readable medium. In alternative embodiments, hard-wired circuitry may be used in place of or in combination with software instructions. Thus, embodiments are not limited to any specific combination of hardware circuitry and software. The term "computer-readable medium" as used herein refers to any medium that participates in providing instructions to a processor for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read. Various forms of computer readable media may be involved in carrying one or more sequences of one or more instructions to processor for execution.

Computer programs comprising machine executable instructions for implementing at least one of the steps of the methods, and/or aspects and/or concepts of the invention described herein or function(s) of various elements of the structural arrangement described herein can be implemented by one or more computers comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor so that the physical processor, in use, reads and executes the specific code instructions embedded in the non-transitory memory. The interface of the special purpose computer may be arranged in communication with the physical processor and receives input parameters that are processed by the physical processor.

It will be appreciated by one skilled in the art that the disclosed arrangements and methods described herein represent a solution to the technological problem described above.

The invention claimed is:

1. A surveillance system for at least one site comprising videosurveillance cameras, the surveillance system comprising:
    at least one surveillance camera management module having at least one input for receiving and one output for sending data:
        of at least one identification of a camera of the videosurveillance cameras performing a video on a supervised zone of the at least one site;
        of at least one signature corresponding to a target detected on the video that is mobile, of a state of the target in the supervised zone that includes:
        an input state in which the target has entered a field of view of the camera,
        an output state in which the target is in an end of the field of view, and
        a disappearance state in which the target has left the field of view; and
        of positioning the target in the supervised zone;
        an artificial neural network for predicting a location of a target in a zone supervised by a camera, connected to the at least one surveillance camera management module, the artificial neural network comprising a target information acquisition input comprising data for prediction comprising identification data of the camera in which a target has been detected,
        positioning data of the target in the output state, direction data of the target, and speed data of the target;
        the artificial neural network comprising an output of at least one identification of a probable camera the target of which will be probably identified based on the data for prediction and the at least one surveillance camera management module comprising an output for transmitting the at least one identification of probable camera to a member comprising a screen,
    wherein the at least one surveillance camera management module is configured to receive a date, including a time, for each state of the target and to calculate a speed or a direction, or both, of the target based on dates and positions for each state of the target;
    the at least one surveillance camera management module using data to perform an incremental learning to the artificial neural network by sending to the artificial neural network:
        an identification of a first camera,
        a position in the output state or a last position of the target in the first camera,
        an identification of a second camera, and
        the direction of the target or the speed, or both, of the target.

2. The surveillance system according to claim 1, wherein the at least one surveillance camera management module is adapted to transmit to the artificial neural network in automatic learning mode the data for predictions as well as the identification of a camera in which the target has reappeared in a zone supervised by the camera after the target has disappeared.

3. The surveillance system according to claim 1, wherein the at least one surveillance camera management module is adapted to further receive target direction data and wherein target data for prediction sent to the artificial neural network further comprises the direction data in the output state.

4. The surveillance system according to claim 1, wherein the at least one surveillance camera management module is adapted to further receive target speed data and wherein target data for prediction sent to the artificial neural network further comprises the direction data in the output state.

5. The surveillance system according to claim 1, wherein the at least one surveillance camera management module is adapted to further receive target class data and wherein target data for prediction sent to the artificial neural network further comprises class data in the output state, wherein a class of the target is a pedestrian, a two-wheel vehicle, a four-wheel vehicle or else.

6. The surveillance system according to claim 1, further comprising:
    a target tracking software assembly per surveillance camera for:
        following the target and deducing direction and speed therefrom, and
        creating a target state;
    a detector for
        extracting a target image from the video,
        performing an image recognition for assigning a class of the target, and
        sending to the target tracking software assembly the target image extracted as well as its class;
    an appearance model provider for:
        receiving the target image extracted by the detector as well as its class,
        giving a signature to the target,
        identifying a number of target characteristics such as colour etc.
        storing in a memory characteristics and signature of the target, and
        sending to the target tracking software assembly the signature corresponding to the target image received;

and wherein the tracking software assembly transmits to the at least one surveillance camera management module the signature of the target, speed, direction, class, state.

7. The surveillance system according to claim 1, wherein the at least one surveillance camera management module is adapted to receive a prediction demand request of a target comprising a signature, and wherein the artificial neural network is adapted to send at its output a list of camera identifications by probability and wherein the at least one surveillance camera management module is further adapted to send to an interface machine the identification of the camera the target of which is in an active state and a possible probable ordered list by probability of camera identifications.

8. The surveillance system according to claim 1, wherein the at least one surveillance camera management module is adapted to add on a zone of the video the target of which is identified in an active state or in the output state, a video recorded by a probable camera identified by the artificial neural network.

9. The surveillance system according to claim 1, wherein the at least one surveillance camera management module is adapted to send a surveillance camera node list as well as a path of the target of the first camera that has identified the target to a most probable camera of the target.

10. The surveillance system according to claim 9, wherein the at least one surveillance camera management module is adapted to send a characteristic that includes a class of the target and/or weights of paths between the videosurveillance cameras calculated by class.

11. A method for following a target using a surveillance system according to claim 1, the method comprising:
  requesting a following of a target on an image;
  recognizing a signature similarity of the target in a signature data base;
  following the target on a video performed by a surveillance camera recording a zone of the at least one site;
  sending a prediction in which the at least one surveillance camera management module sends target data to the artificial neural network including at least the position of the target when the position of the target is located in a zone of the zone recorded by the surveillance camera corresponding to an output state;
  receiving from the artificial neural network an identification of a probable camera in which the target can appear if it disappears from the field of view of the camera identified;
  adding on the video of the camera identified the identification of the probable camera; and,
  sending a viewing, to the member comprising a screen, of the video as well as the identification of the probable camera.

* * * * *